United States Patent
Jones et al.

(10) Patent No.: US 10,922,645 B2
(45) Date of Patent: Feb. 16, 2021

(54) METHODS AND SYSTEMS FOR FACILITATING PRODUCT ON-SHELF-AVAILABILITY

(71) Applicant: Walmart Apollo, LLC, Bentonville, AR (US)

(72) Inventors: Matthew A. Jones, Bentonville, AR (US); Robert J. Taylor, Rogers, AR (US); Nicholaus A. Jones, Fayetteville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 486 days.

(21) Appl. No.: 15/366,874

(22) Filed: Dec. 1, 2016

(65) Prior Publication Data

US 2017/0161675 A1    Jun. 8, 2017

Related U.S. Application Data

(60) Provisional application No. 62/262,266, filed on Dec. 2, 2015.

(51) Int. Cl.
  *G06Q 10/08* (2012.01)
  *G06Q 10/06* (2012.01)

(52) U.S. Cl.
  CPC ..... *G06Q 10/087* (2013.01); *G06Q 10/06311* (2013.01)

(58) Field of Classification Search
  CPC ...... G06Q 10/087; G06Q 30/02; G06Q 30/00; G06Q 30/0202; G06Q 10/103; G06Q 10/10; G06Q 10/00; G06Q 20/203; G06Q 10/06311; G06N 5/02; G06N 5/025
  See application file for complete search history.

(56) References Cited

U.S. PATENT DOCUMENTS

| | | | |
|---|---|---|---|
| 7,650,298 B2 | 1/2010 | Godlewski | |
| 8,131,397 B2 | 3/2012 | Vahlberg | |
| 8,321,303 B1* | 11/2012 | Krishnamurthy | 705/28 |
| 8,396,585 B2 | 3/2013 | Antony | |
| 2004/0181461 A1* | 9/2004 | Raiyani | G06Q 30/02 705/14.64 |
| 2008/0215180 A1 | 9/2008 | Kota | |

(Continued)

OTHER PUBLICATIONS

Sailrite, Sailrite Order Picking System by OZ Development, Jan. 2013 https://www.youtube.com/watch?v=hnPxM_B69cw (Year: 2013).*

(Continued)

*Primary Examiner* — Patricia H Munson
*Assistant Examiner* — Thea Labogin
(74) *Attorney, Agent, or Firm* — Fitch, Even, Tabin & Flannery, LLP

(57) ABSTRACT

In some embodiments, methods and systems of determining whether to purge a bin in order to pick a product from the bin in a stock room of a retail sales facility include processing of bin purge factors associated with the bin and correlating the processed bin purge factors with bin purge threshold values associated with the bin. Based on whether the value of one or more of the bin purge factors meets or exceeds a threshold value that supports the purging of a bin, an indication to a worker at the retail sales facility is generated as to whether that bin is to be purged or not.

6 Claims, 4 Drawing Sheets

(56) References Cited

U.S. PATENT DOCUMENTS

2013/0233922 A1* 9/2013 Schoening .......... G06Q 10/087
235/385
2014/0100769 A1 4/2014 Wurman

OTHER PUBLICATIONS

"Schedule Replenishment"; https://www.consolut.com/en/s/sap-ides-access/d/s/doc/D-$SCWM$REPLENISHMENT; Sep. 10, 2015 (5 pgs.).
"The Art and Science of Warehouse Slotting Optimization"; http://www.mwpvl.com/html/warehouse_slotting_optimization.html; Oct. 9, 2015 (4 pgs.).
"Warehousing and Storage"; http://help.sap.com/SCENARIOS_BUS2012/helpdata/EN/2e/4dea53653c115be10000000a174cb4/content.htm; Oct. 9, 2015; (5 pgs).

* cited by examiner

METHODS AND SYSTEMS FOR FACILITATING PRODUCT ON-SHELF-AVAILABILITY

RELATED APPLICATIONS

This application claims the benefit of U.S. Provisional Application No. 62/262,266, filed Dec. 2, 2015, which is incorporated herein by reference in its entirety.

TECHNICAL FIELD

This disclosure relates generally to managing products at a retail sales facility and, in particular, to systems and methods for facilitating availability of products on the sales floor of the retail sales facility.

BACKGROUND

Retail sales facilities such as large department stores typically store overstock products in storage bins located in their stock rooms. A stock room of a typical retail sales facility may store thousands of bins, and each storage bin may in turn contain dozens, hundreds, or even thousands of products. When products on the shelves on the sales floor of the retail sales facility are purchased by the consumers, the products stored in the stock room are picked from their respective bins and worked to the shelves on the sales floor.

In order for a worker at the retail sales facility to pick a product from a given bin, the worker has to first find the product in the bin. Finding a product to be picked in a bin sometimes involves searching for the product to be picked in the bin, but often involves "bin dumping" or "bin purging," or removal of all of the products from the bin in order to make it easier to find the product to be picked. Given the large number of products stored in the bins in a stock room of a retail sales facility, bin emptying to find a product to be picked and then returning the removed products back into the bins is a time consuming and voluminous task that increases the operational costs of the retail sales facility and may result in inefficiencies in picking the products from the bins and timely delivering the picked products to a shelf on the sales floor to replenish the products displayed on the shelf and available to the consumers.

BRIEF DESCRIPTION OF THE DRAWINGS

Disclosed herein are embodiments of systems, devices, and methods pertaining to methods and systems for facilitating on-shelf-availability of products on a sales floor of a retail sales facility. This description includes drawings, wherein.

Figure 1:
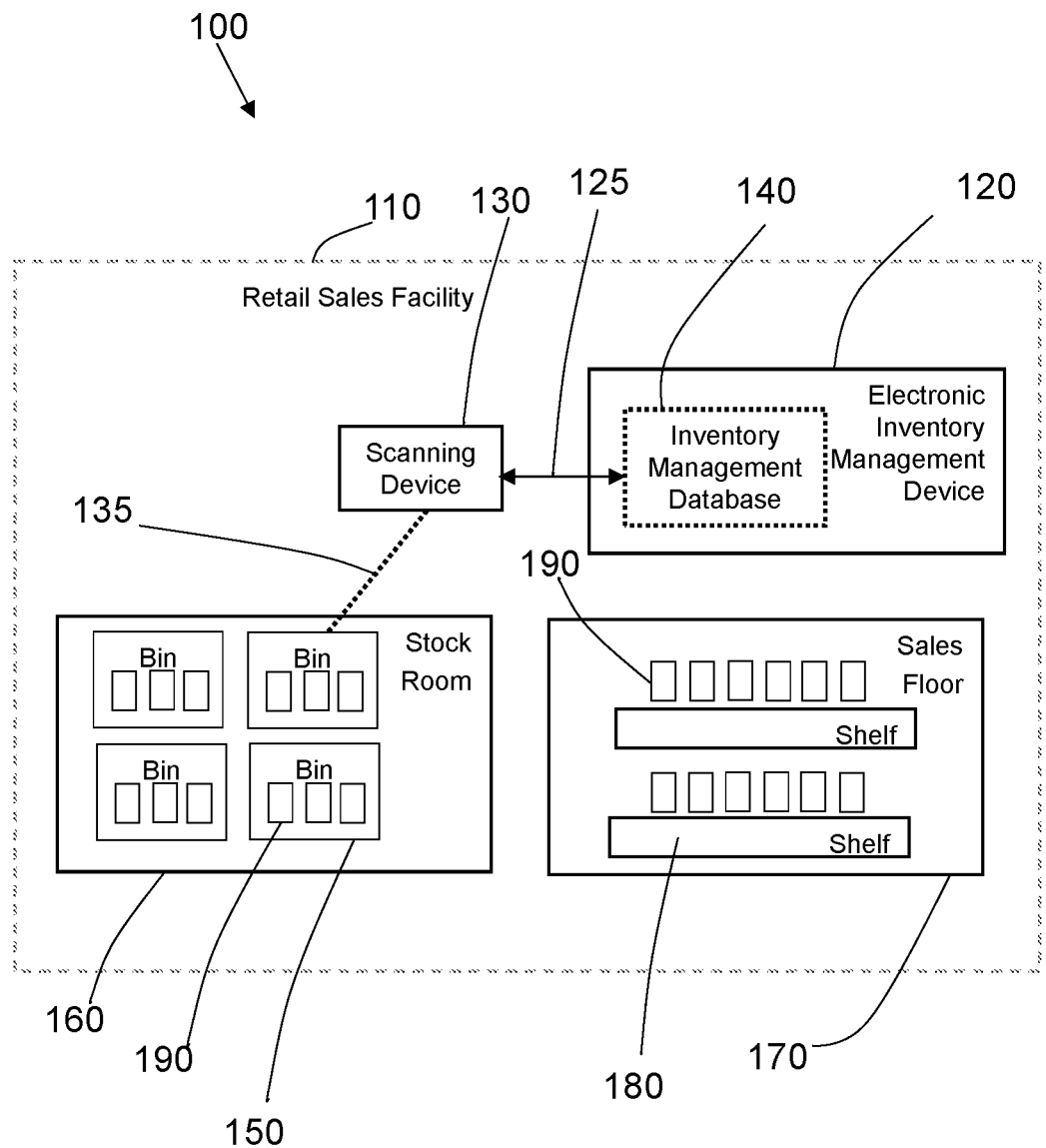
FIG. 1 is a diagram of a system of facilitating on-shelf-availability of products on a sales floor of a retail sales facility in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Generally, this application describes systems and methods of facilitating on-shelf availability of products on a sales floor of a retail sales facility by determining whether or not to pick products from bins based on processing at least one purge factor associated with the bin.

In one embodiment, a method of facilitating on-shelf-availability of products on a sales floor of a retail sales facility includes: receiving, at an electronic inventory management device including a processor-based control unit, at least one bin purge factor for at least one bin at the stock room location of the retail sales facility; setting, using the electronic inventory management device, a predetermined threshold value of the at least one bin purge factor; obtaining, using the electronic inventory management device, the at least one bin purge factor for the at least one bin and determining whether the predetermined threshold value of the obtained at least one bin purge factor supports emptying all of the products from the at least one bin for picking at least one product from the products removed from the at least one bin and for placing the at least one picked product onto a shelf of the sales floor of the retail sales facility; and generating, using the electronic inventory management device and based on the determining step, an indication to the worker at the retail sales facility whether the determining step supports the emptying of all of the products from the at least one bin for the picking of the at least one product from the products removed from the at least one bin.

In another embodiment, a system for facilitating on-shelf-availability of products on a sales floor of a retail sales facility includes an electronic database configured to store at least one purge factor for at least one bin at the stock room location of the retail sales facility and an electronic inventory management device in communication with the electronic database. The electronic inventory management device includes a processor-based control unit configured to: receive the at least one bin purge factor for at least one bin at the stock room location of the retail sales facility; set a predetermined threshold value of the at least one bin purge factor; obtain the at least one bin purge factor for the at least one bin and determine whether the predetermined threshold value of the obtained at least one bin purge factor supports emptying all of the products from the at least one bin for picking at least one product from the products removed from the at least one bin and placing the picked at least one picked product onto a shelf of the sales floor of the retail sales facility; and generate, based on the determining step, an indication to the worker at the retail sales facility whether the determination supports the emptying of all of the products from the at least one bin for the picking of the at least one product from the products removed from the at least one bin.

In yet another embodiment, a system of facilitating on-shelf-availability of products on a sales floor of a retail sales facility includes: means for receiving at least one bin purge factor for at least one bin at the stock room location of the retail sales facility; means for setting a predetermined threshold value of the at least one bin purge factor; means for obtaining the at least one bin purge factor for the at least one bin and determining whether the predetermined threshold value of the obtained at least one bin purge factor supports emptying all of the products from the at least one bin for picking at least one product from the products removed from the at least one bin and placing the at least one picked product onto a shelf of the sales floor of the retail sales facility; and means for generating, based on the determining step, an indication to the worker at the retail sales facility whether the determining step supports the emptying of all of the products from the at least one bin for the picking of the at least one product from the products removed from the at least one bin.

FIG. 1 shows an exemplary embodiment of a system 100 for facilitating availability of products 190 (e.g., stored in storage bins 150 at a stock room 160 of a retail sales facility 110) on a sales floor 170 (e.g., on shelves 180) of the retail sales facility 110. The retail sales facility 110 may be any place of business (e.g., a brick-and-mortar store) where products 190 are stocked and sold to consumers. While the stock room 160 is illustrated in FIG. 1 for ease of illustration as having only four storage bins 150 each housing six products 190, it will be appreciated that the stock room 160 of the retail sales facility 110 may store numerous (e.g., hundreds or thousands) of bins 150, and that each bin 150 may contain dozens, hundreds, or thousands of products 190.

The exemplary system 100 depicted in FIG. 1 includes an electronic inventory management device 120 configured generally to manage the inventory of products 190 at the retail sales facility 110, and more specifically, to manage data associated with the products 190 stored in the bins 150 and/or located on the sales floor 170 and/or sold at the retail sales facility, as well as worker tasks (i.e., action to be taken by a worker) with respect to the bins 150 and the products 190 in the bins 150. The electronic inventory management device 120 in FIG. 1 may be a stationary or portable electronic device including a processor-based control unit, for example, a desktop computer, a laptop computer, a tablet, a mobile phone, or any other electronic device configured for data entry and one-way and/or two-way communication (e.g., wireless connection 125) with another device located at the retail sales facility 110 (e.g., scanning device 130), or at a location remote to the retail sales facility 110 (e.g., a regional server configured for two-way communication with electronic inventory management devices 120 at several retail sales facilities 110).

With reference to FIG. 1, the exemplary electronic inventory management device 120 includes an inventory management database 140 configured to store electronic information regarding the bins 150 and products 190 at the retail sales facility 110. In some embodiments, the inventory management database 140 may store electronic data including but not limited to: historical data derived from transaction data and worker tasks pertaining to the products 190 (i.e., total numbers of products 190 delivered and/or purchased, binning of products, and product picks), worker accuracy when performing worker tasks, product inventorying accuracy at individual departments of the retail sales facility 110 or retail sales facility 110 as a whole, availability of worker time for binning, picking, etc. The inventory management database 140 may be stored, for example, on non-volatile storage media (e.g., a hard drive, flash drive, or removable optical disk) internal or external relative to the electronic inventory management device 120, or internal or external to computing devices (e.g., remote server) separate from the electronic inventory management device 120.

In some embodiments, the inventory management database 140 may store electronic data in the form of bin purge factors pertaining to the bins 150 in the stock room 160 of the retail sales facility 110. Such bin purge factors may include but are not limited to: a total number of times at least one product 190 is picked from the bin 190 and binned into the bin 150; a total number of picks scheduled for the bin 150; a total number of products 190 stored in the bin 150; a department at the retail sales facility 110 associated with the products 190 stored in the bin 150; accuracy percentage of one or more workers at the retail sales facility 110 during picking and/or auditing of the bin 150; accuracy percentage of at least one department at the retail sales facility 110 in inventorying products 190 in the bin 150; and a number of tasks presently in queue for one or more workers at the stock room 160 of the retail sales facility 110.

The bin purge factors and other electronic data that can be stored in the inventory management database 140 in association with the products 190 in the bins 150 may be received by the electronic inventory management device 120, for example, as a result of a worker (e.g., stock room associate) scanning the products 190 using the scanning device 130, for example when binning a product 190 into a bin 150, when picking a product 190 from the bin 150, when auditing a bin 150, or while performing any other task with respect to the product 190 in the bin 150. In some embodiments, at least some of the electronic data representing one or more bin purge factors may be transmitted to the electronic inventory management device 120 from a remote (e.g., regional) server. By way of example, historical data reflecting individual worker accuracy and/or overall department accuracy when auditing the bins 150 and/or otherwise inventorying products 190 may be received by the electronic inventory management device 120 from a server located at a product distribution center or a server at a regional data center. It will be appreciated that the inventory management database 140 does not have to be incorporated into the electronic inventory management device 120 as shown in FIG. 1, but may be stored on a remote (e.g., regional) server in communication with the electronic inventory management device 120.

In some embodiments, the scanning device 130 of FIG. 1 may be an electronic (e.g., hand-held) scanner that may be carried by a worker at the retail sales facility 110. Examples of such scanning devices 130 may include, but are not limited to barcode readers, RFID readers, SKU readers, electronic tablets, cellular phones, or the like mobile electronic devices. Alternatively, the scanning device 130 may be a stationary electronic scanning device installed in the stock room 160 of the retail sales facility 110. In the exemplary embodiment illustrated in FIG. 1, the scanning device 130 may obtain electronic data associated with the bin 150 and the products 190 in the bin 150 by communicating via a communication channel 135 (e.g., radio waves) with a unique identifying indicia (e.g., barcode, RFID (radio frequency identification), or SKU (stock keeping unit number)) on an exterior of the bin 150.

After a bin 150 is scanned via the scanning device 130 as described above, the electronic inventory management device 120 may receive electronic data associated with the bin 150 (e.g., uniquely identifying the bin 150) and/or the products 190 in the bin 150 from the scanning device 130 by way of a two-way communication channel 125, which may be a wired or wireless (e.g., Wi-Fi) connection. For example, when a worker bins a product 190 into a bin 150 in the stock room 160 of the retail sales facility 110, the worker may use the scanning device 130 to scan the unique identifier on the bin 150 and the unique identifier on the product 190 being binned into this bin 150, in response to which the data uniquely identifying the bin 150 and the product 190 is obtained by the scanning device 130. In addition, as the associate bins the product 190 into the bin 150, data identifying the task performed by the associate with respect to the product 190 and bin 150 may be entered into the system 100 via the scanning device 130.

Figure 2:
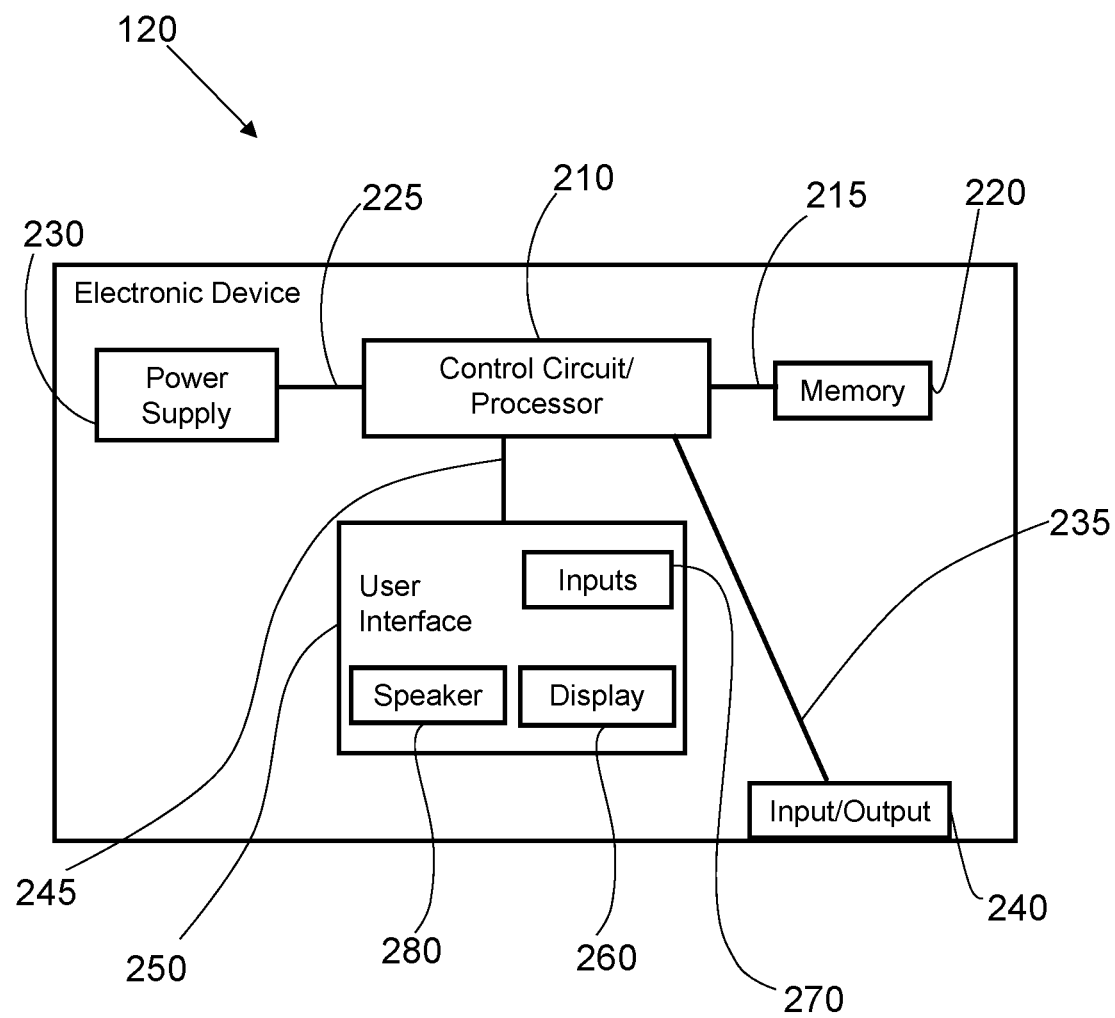
FIG. 2 is a functional block diagram of an electronic inventory management device in accordance with some embodiments.

An exemplary electronic inventory management device 120 depicted in FIG. 2 is a computer-based device and includes a control circuit (i.e., control unit) 210 including a processor (for example, a microprocessor or a microcontroller) electrically coupled via a connection 215 to a memory 220 and via a connection 225 to a power supply 230. The control unit 210 can comprise a fixed-purpose hard-wired platform or can comprise a partially or wholly programmable platform, such as a microcontroller, an application specification integrated circuit, a field programmable gate array, and so on. These architectural options are well known and understood in the art and require no further description here.

This control unit 210 can be configured (for example, by using corresponding programming stored in the memory 220 as will be well understood by those skilled in the art) to carry out one or more of the steps, actions, and/or functions described herein. In some embodiments, the memory 220 may be integral to the processor-based control unit 210 or can be physically discrete (in whole or in part) from the control unit (i.e., control unit) 210 and is configured non-transitorily store the computer instructions that, when executed by the control unit 210, cause the control unit 210 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM)) as well as volatile memory (such as an erasable programmable read-only memory (EPROM))).

Accordingly, the memory and/or the control unit may be referred to as a non-transitory medium or non-transitory computer readable medium. The control unit 210 of the electronic inventory management device 120 is also electrically coupled via a connection 235 to an input/output 240 that can receive signals from and send signals (via a wired or wireless connection) to (e.g., commands, inventory database information), for example, devices (e.g., scanning device 130) local to the retail sales facility 110, or one or more servers remote to the retail sales facility 110.

Optionally, instead of receiving information regarding the products 190 in the bins 150 from a separate scanner such as the scanning device 130, the control unit 210 may also be electrically coupled to a sensor such as a reader configured to detect and/or read information on the identifying indicia (e.g., a label) located on the products 190 and/or on the bins 150 when the electronic inventory management device 120 is placed in direct proximity to a bin 150 and/or a product 190 in the bin 150. Such an optional reader may be a radio frequency identification (RFID) reader, an optical reader, a barcode reader, or the like.

In the embodiment shown in FIG. 2, the processor-based control unit 210 of the electronic inventory management device 120 is electrically coupled via a connection 245 to a user interface 250, which may include a visual display or display screen 260 (e.g., LED screen) and/or button input 270 that provide the user interface 250 with the ability to permit a user such as a stock room or sales floor associate at the retail sales facility 110 to manually control the electronic inventory management device 120 by inputting commands, for example, via touch-screen and/or button operation or voice commands. The display screen 260 can also permit the user to see various menus, options, worker tasks, and/or alerts displayed by the electronic inventory management device 120. The user interface 250 of the electronic inventory management device 120 may also include a speaker 280 that may provide audible feedback (e.g., alerts) to the user.

Figure 3:
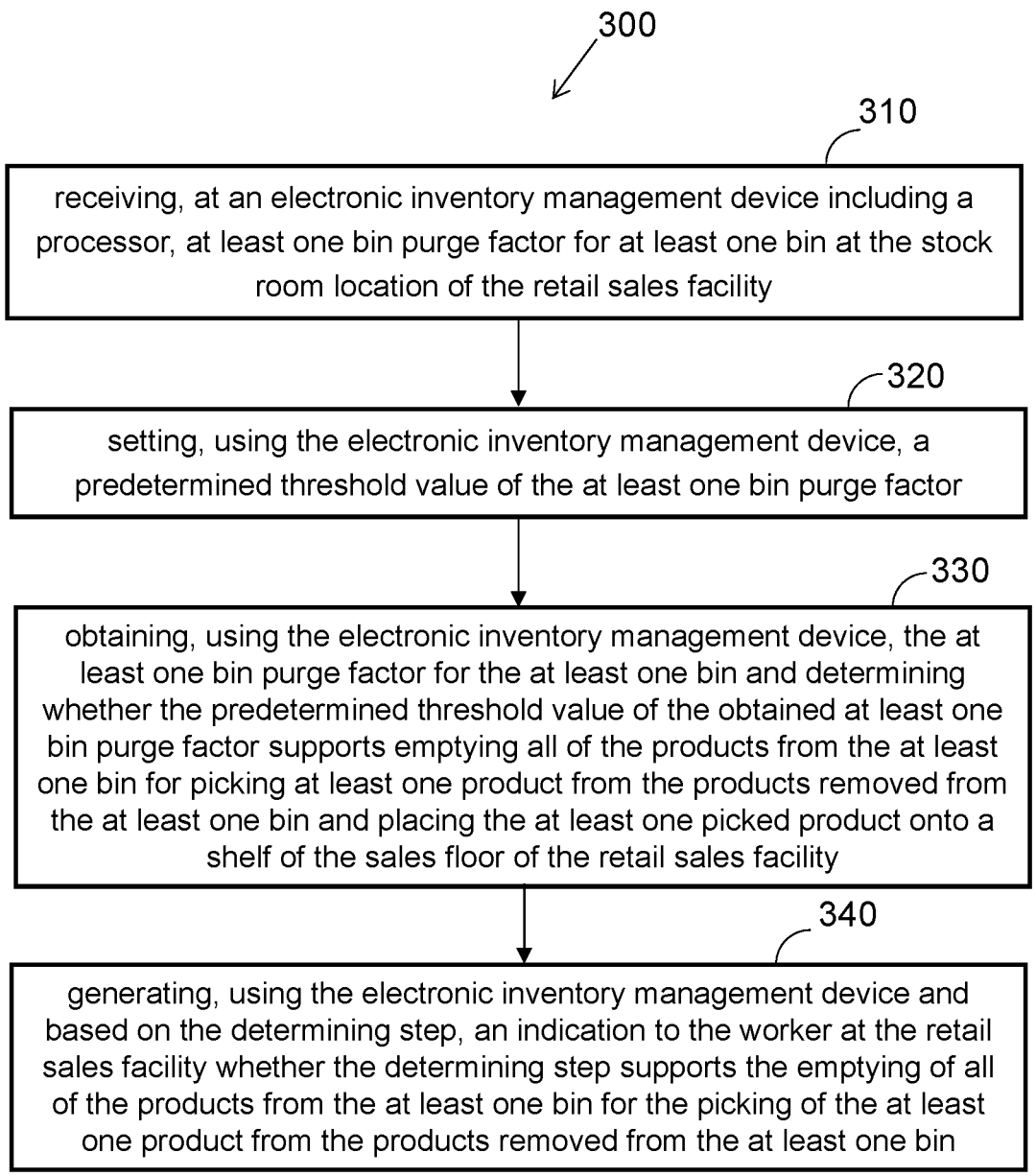
FIG. 3 is a flow diagram of a process of facilitating on-shelf-availability of products on a sales floor of a retail sales facility in accordance with some embodiments.

With reference to FIGS. 1-3, one method 300 of operation of the system 100 for facilitating on shelf-availability of products 190 on a sales floor 170 of a retail sales facility 110 will now be described. For exemplary purposes, the method 300 is described in the context of the system of FIG. 1, but it is understood that embodiments of the method 300 may be implemented in the system 100 or other systems. As shown in FIG. 3, the method 300 includes receiving, at the electronic inventory management device 120, one or more bin purge factors for one or more bins 150 at the stock room location 160 of the retail sales facility 110 (step 310).

In some embodiments, the bin purge factors that may be processed by the control unit 210 of the electronic inventory management device 120 to determine whether the bin 150 is to be emptied out (i.e., purged) by a worker at the retail sales facility 110 in order to perform a pick of a product 190 to be worked to the sales floor 170 include, but are not limited to: a total number of times a product 190 is picked from and/or binned into the bin 150; a total number of picks scheduled for the bin 150; a total number of products 190 stored in the bin 150; a department at the retail sales facility 110 associated with the products 190 stored in the bin 150; worker accuracy percentage at the retail sales facility 110 (and/or at an individual department) during picking and/or auditing of the bin 150; accuracy percentage of at least one department at the retail sales facility 110 in inventorying products 190 in the bin 150; and a number of tasks presently in queue for one or more workers at the stock room 160 of the retail sales facility 110.

It will be appreciated that the above bin purge factors are shown by way of example only, and that both additional and alternative bin purge factors may be factored in by the processor or the control unit 210 of the electronic inventory management device 120 to determine whether a bin 150 is to be purged or not in order to facilitate the picking of a product 190 from the bin 150. In some embodiments, the generated bin purge factors are stored in the inventory management database 140 of the electronic inventory management device 120, but it will be appreciated that the bin purge factors, after being generated by the electronic inventory management device 120, may be transmitted to a database server remote to the retail sales facility 110.

In some embodiments, after the stocking associate at the retail sales facility 110 scans an identifying indicia of a product 190 using the scanning device 130 (e.g., when binning the product 190 into the bin 150 or picking the product 190 from the bin), the scanning device 130 transmits a signal (e.g., via communication channel 135) to the electronic inventory management device 120. This signal may include electronic data associated with the product 190 and/or the bin 150 including, but is not limited to a unique identifier of the product 190, a unique identifier of the bin 150 into which the product 190 was binned and/or from which the product 190 was picked, and an indication of an action (i.e., worker task) taken by the stocking associate with respect to the product 190 and/or the bin 150.

In some embodiments, the processor of the control unit 210 of the electronic inventory management device 120 is programmed, after receiving such electronic data, to send a signal to the inventory management database 140 to enable the inventory management database 140 to be updated with this electronic data. It will be appreciated that instead of transmitting the electronic data associated with the product 190 to the electronic inventory management device 120 directly (e.g., via communication channel 125), the scanning device 130 may transmit the data obtained based on scanning the product 190 to a remote inventory management database (e.g., regional data bank) located at a server remote to the retail sales facility 110.

In some embodiments, each of the bins 150 has one or more bin purge factors associated with it to enable the control unit 210 of the electronic inventory management device 120 to reach a decision of whether to purge the bins 150 or not when a product 190 is being picked from the bins 150. The bin purge factors associated with each bin 150 may be entered by a worker into the electronic inventory management device 120 or generated by the control unit 210 of the electronic inventory management device 120. The bin purge factors, after being manually entered by a user or generated by the electronic inventory management device 120 may be stored in the inventory management database 140 internal to the electronic inventory management device 120, or may be stored on a remote database in wired or wireless communication with the electronic inventory management device 120. When a bin 150 for which one or more the bin purge factors are to be obtained is determined by the electronic inventory management device 120 (e.g., as a result of a worker scanning the bin 150 using the scanning device 130), the control unit 210 is programmed to send a signal including a request for the one or more bin purge factors associated with that bin 150 to be retrieved either from the inventory management database 140 or from the remote (e.g., regional) inventory management database and to be transmitted to the control unit 210 accordingly.

In the exemplary method 300 illustrated in FIG. 3, the control unit 210 of the electronic inventory management device 120 is programmed to generate and set a predetermined threshold value of the at least one bin purge factor associated with a bin 150 of interest (step 320). In some embodiments, this predetermined threshold value may be based on various factors associated with the products 190 in the bin 150, as will be discussed in more detail below. In some embodiments, the threshold value of the bin purge factors may be manually entered by a worker at the retail sales facility 110 into the electronic inventory management device 120, or may be obtained by the electronic inventory management device 120 from a server remote to the electronic inventory management device 120 (e.g., regional server). Some exemplary threshold values for bins 150 according to an embodiment will be discussed below with reference to FIG. 4.

In some embodiments, the control unit 210 of the electronic inventory management device 120 may be programmed to set the threshold for supporting the purging of a bin 150 based on whether the products 190 stored in the bin 150 are stored as pallets, cases, or eaches. The varying threshold values for bins 150 storing eaches, cases, and pallets are a result of significantly different numbers of individual items in the bins 150, since a bin 150 that contains the products 190 as eaches would contain significantly more individual items than a bin 150 that contains (the larger in size) cases of this product 190, while a bin 150 that contains (the even larger in size) pallets of the product 190 would contain a significantly lower number of individual pallets.

In some embodiments, the control unit 210 may include smart logic in that the control unit 210 is programmed to adjust the preset threshold value of one or more bin purge factors for a bin 150 based on, for example, at least one previous purging and/or audit of the bin 150, a significant increase or decrease in the number of products 190 in the bin 150, or a significant increase or decrease in worker accuracy in picking and/or binning and/or auditing of the products 190 in the bin 150. For example, if the control unit 210 of the electronic inventory management device 120 receives data indicating that worker accuracy was significantly higher or lower during one or more preceding purges of a bin 150, the control unit 210 may adjust the bin purge factor relating to worker accuracy accordingly. As such, the control unit 210 is configured to set bin purge factor thresholds based on updated real-time information, thereby increasing the accuracy of the preset thresholds of bin purge factors for specific bins 150 at retail sales facilities 110. It will be appreciated that the preset threshold value of each of the bin purge factors may also be manually adjusted by a worker at the retail sales facility 110 using the electronic inventory management device 120 to provide any necessary adjustments to the preset thresholds.

In the exemplary embodiment of FIG. 3, after the predetermined threshold values of the bin purge factors are set, the control unit 210 of the electronic inventory management device 120 is programmed to obtain one or more of the above-discussed bin purge factors for one or more bins 150 and determine whether the predetermined threshold value of the obtained bin purge factors supports emptying all of the products from the bins 150 in order to pick one or more products 190 from the products 190 removed from the bins 150 for the purpose of placing the picked product 190 onto a shelf 180 of the sales floor 170 of the retail sales facility 110 (step 330).

In some embodiments, a determination by the control unit 210 of whether or not a bin 150 is to purged depends on a number of bin purge factors for which the predetermined threshold is met and/or exceeded. For example, the control unit 210 may generate an indication to the worker at the retail sales facility 110 that the obtained bin purge factors support the purging of the bin 150 in response to a determination that a single threshold value for the obtained bin purge factors meets or exceeds the predetermined threshold value that supports the purging of the bin 150. In other embodiments, the control unit 210 may generate an indication to the worker at the retail sales facility 110 that the obtained bin purge factors support the purging of the bin 150 in response to a determination that two or more threshold values for the obtained bin purge factors meet or exceed the predetermined threshold value that supports the purging of the bin 150. In other embodiments, the control unit 210 may generate an indication to the worker at the retail sales facility 110 that the obtained bin purge factors support the purging of the bin 150 in response to a determination that all of the threshold values for the obtained bin purge factors meet the predetermined threshold value that supports the purging of the bin 150.

Generally, when the control unit 210 of the electronic inventory management device 120 determines that a value for one or more of the obtained bin purge factors meets or exceeds one or more of the threshold values associated with these bin purge factors and stored in the inventory management database 140 of the electronic inventory management device 120, the control unit 210 is programed to generate an indication to the worker at the retail sales facility 110 whether the determination at step 330 supports the emptying of all of the products 190 from one or more bins 150 for picking one or more products 190 from the products 190 removed from the one or more bins 150 and for placing the picked products 190 onto a shelf 180 on the sales floor 170 of the retail sales facility 110 (step 340). Such an indication or output may be generated for a worker at the retail sales facility 110 on the visual display 260 or via the speaker 280 of the electronic inventory management device 120.

In some embodiments, the indication to the worker of whether to audit a bin 150 may be in the form of a list (e.g., a list of bins 150 to be purged). In some embodiments, when the determination at step 330 supports the emptying of all of the products 190 from multiple bins 150 (e.g., in order to enable an associate to pick products 190 from multiple bins 150 to place on a shelf 180 on the sales floor 170), the control unit 210 of the electronic inventory management device 120 is programmed to generate an indication of a total number of bins 150 to be purged and an identification of the bins 150 to be purged in order to facilitate the picking of the products 150.

Conversely, when the control unit 210 of the electronic inventory management device 120 determines that a value for one or more of the obtained bin purge factors does not meet the value for the corresponding bin management factor thresholds stored in the inventory management database 140 of the electronic inventory management device 120, the control unit 210 of the electronic inventory management device 120 is programed to generate an indication to the worker at the retail sales facility 110 that the bin 150 of interest is not to be purged. For example, in some embodiments, when a worker is attempting to perform a pick of a product 190 from a bin 150 and one or more of the threshold values for that bin 150 do not support the purging of a bin 150 in order to pick the product 190, the worker at the retail sales facility 110 may be notified (e.g., on a display of the scanning device 130) that the bin 150 is not to be purged and/or that the bin 150 is to be manually searched without emptying the products 190 from the bin 150 (i.e., without purging the bin 150) in order to find the product 150 to be picked.

Figure 4:
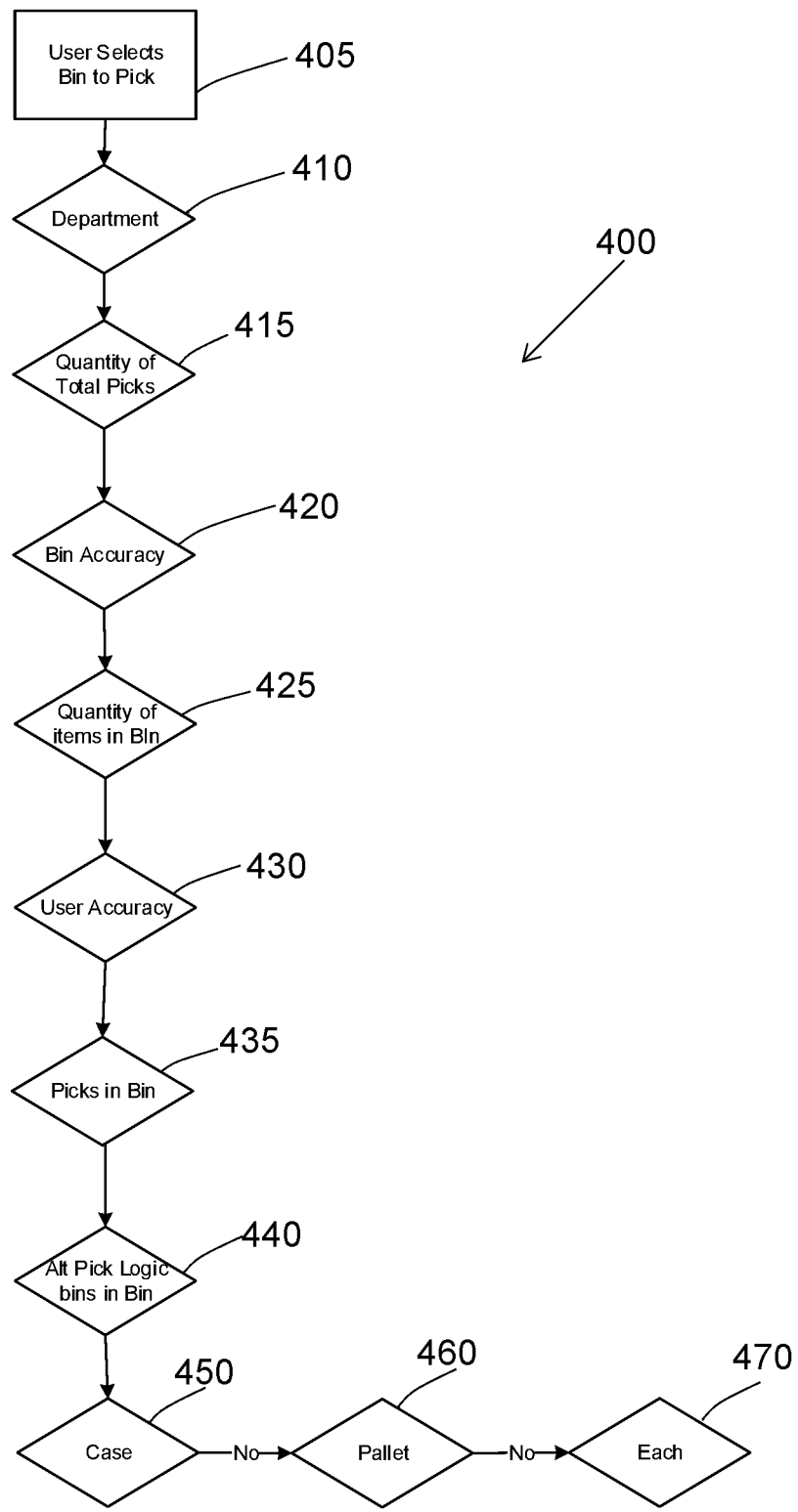
FIG. 4 is a flow diagram of a method of facilitating on-shelf-availability of products on a sales floor of a retail sales facility in accordance with some embodiments.

FIG. 4 shows an exemplary operational workflow in implementing a method 400 in order to determine whether to purge a bin 150 in order to pick a product 190 from the bin 150 for working the picked product 190 to a shelf 180 on a sales floor 170 of a retail sales facility 110 according to one embodiment. In the embodiment according to FIG. 4, the workflow is initiated after a user (e.g., worker) at a retail sales facility selects a bin 150 to pick a product 190 from (step 405). Such selection of the bin 150 may occur when a user scans identifying indicia (e.g., bar code) on the bin 150 using the scanning device 130. After a bin 150 is selected, the control unit 210 of the electronic inventory management device 120 is programed to determine, based upon processing one or more bin purge factors stored in the database 140 in association with that bin 150, whether the bin 150 is to be purged in order to facilitate the picking of a product 190 from the bin 150. In the exemplary embodiment of FIG. 4, the processor of the control unit 210 of the electronic inventory management device 120 is programed to analyze a workflow based on the following exemplary bin purge factors to arrive at a decision of whether or not to purge the bin 150 in order for a worker to pick a product 190 from the bin 150:

Step 410—"Department"—the department at the retail sales facility 110 associated with the product 190;

Step 415—"Quantity of Total Picks"—the total number of picks that have been made from the bins 150 associated with the Department;

Step 420—"Bin Accuracy"—the historical accuracy percentage of the Department in inventorying the bins 150;

Step 425—"Quantity of Items In Bin"—the quantity (i.e., total number) of products 190 in the bin 150;

Step 430—"User Accuracy"—the historical accuracy of users (e.g., stock room associates) when picking products 190 from the bin 150, binning products 190 into the bin 150 and/or auditing the bin 150;

Step 435—"Picks in Bin"—the number of picks scheduled (i.e., active picks) for the bin 150;

Step 440—"Alt Pick Logic Picks in Bin"—alternative pick logic associated with the products in the bin 150.

In the exemplary work flow associated with the method 400 of FIG. 4, a determination by the control unit 210 of the electronic inventory management device 120 can be made based on the logic equations discussed below:

$$B_{purge} = \alpha F(A_{CC}) + \beta F(B_{OH}) + \delta F(U_{Acc}) + \epsilon F(P_A) + \phi F(P_{alt})$$ Equation 1:

$$Purge_T = T_{Hours} - (P_t * P_{qty})$$ Equation 2:

$$0 = Purge_T - (B_{qty} * P_t)$$ Equation 3:

As discussed above, in some embodiments, the determination of whether a bin 150 is to be purged in order to pick one or more products 190 from the bin 150 is affected by whether the product 190 is stored in the bin 150 as eaches, in cases, or on pallets. In one approach, when the product 190 is stored in the bin 150 in cases 450, the values of all of the weighted factors (i.e., $\alpha$, $\beta$, $\delta$, $\epsilon$, and $\phi$) in the exemplary equation above are selected to be equal to 0.2. To account for the products 190 in the bins 150 being stored on pallets 460, the weighted values in the exemplary equation above are adjusted as follows: $\epsilon=0.30$; $\phi=0.25$ $\beta=0.35$, $\alpha=0.05$, and $\delta=0.05$. To account for the products 190 in the bins 150 being stored as eaches 470, the weighted values in the exemplary equation above are adjusted as follows: $\epsilon=0.35$; $\theta=0.35$ $\beta=0.20$, $\alpha=0.05$, and $\delta=0.05$. It will be appreciated that the weighted values in the exemplary equations above and the bin purge threshold values are discussed by way of example only, that the bin purge factors are shown in FIG. 4 by way of example only, and that both alternative and additional bin purge factors may be processed the control unit 210 of the electronic inventory management device 120 to determine whether a bin 150 is to be purged or not to facilitate the picking of one or more products 190 from the bin 150.

While FIG. 4 shows that the determination by the control unit 210 of whether or not to purge the bin 150 to facilitate a pick of a product 190 from the bin 150 is generated based on processing seven bin purge factors (410, 415, 420, 425, 430, 435, and 440), it will be appreciated that the processor of the control unit 210 may be programmed to generate the determination of whether or not to purge the bin 150 based on a determination that any one, any two, any three, any four, any five, or any six of these bin purge factors meets or exceeds the predetermined threshold values associated with these bin purge factors. In some embodiments, the indication to the worker of whether to purge a bin 150 may be in the form of a list of identified bins 150 to be purged, and the bins 150 determined by the control unit 210 of the electronic inventory management device 120 to not be purged do not appear on such a list.

In some embodiments, the following exemplary probabilities may be factored in and processed by the control unit 210 of the electronic inventory management device 120 when determining whether a bin 150 should be audited or not to facilitate a pick of a product 190.

In some embodiments, the number of bins 150 that will be purged may be determined by the control unit 210 by calculating the time or hours allocated to associates minus the quantity of picks times the time to pick. After a quantity of bins 150 to be purged are determined, the exemplary process flow of FIG. 4 may be followed to determine the bins 150 that will be purged based on the exemplary governing equation and weight factors above.

In some embodiments, the value of Bpurge being greater than a present bin purge threshold will determine the bins 150 qualified for purging. In addition, the qualified bins 150 will be purged (Bpurge max) until the quantity of bins 150 by time is reached. The value of Accuracy Factor, F(Acc), in the exemplary Equation 1 discussed above is governed by reducing the likelihood of a purge as accuracy (Acc) increases and increases the likelihood of a purge if accuracy is low.

$$F(Acc) = 1 - \frac{1}{B} Acc$$

If $F(Acc) < 0$ then $F(Acc) = 0$

If $F(Acc) > 1$ then $F(Acc) = 1$

Where B may be determined and adjusted based on experimental results and historical data.

The value of on-hand factor, $F(B_{OH})$, is governed by reducing the likelihood of a purge as on hands (OH) increase.

$$F(B_{OH}) = 1 - \left(\frac{OH}{OH_{max}}\right)^3$$

If $F(B_{OH}) < 0$ then $F(B_{OH}) = 0$

Where OHmax is the maximum number of products 190 in the bin 150 that can be purged.

The user accuracy Factor, $F(U_{acc})$, is governed by reducing the likelihood of a purge if the users accuracy is low.

$$F(U_{Acc}) = \left(\frac{U_{Acc}}{U_{target}}\right)^{\frac{1}{2}}$$

If $F(U_{Acc}) < 0$, then $F(U_{Acc}) = 0$

If $F(U_{Acc}) > 1$, then $F(U_{Acc}) = 1$

Where $U_{target}$ is the accuracy threshold for users to purge the bins 150.

The picks factor, $F(P_A)$, is the quantity of system-generated picks in the bin 150, and a function that will govern the likelihood of a bin 150 to be purged such that the greater $P_A$ the more likely the bin will be purged.

$$F(P_A) = \frac{P_A}{B}$$

If $F(P_A) > 1$, then $F(P_A) = 1$

If $F(P_A) < 0$, then $F(P_A) = 0$

Where B may be set based on testing at the retail sales facility 110 (initial value may be 2).

The alternative logic pick factor, $F(P_{alt})$, is a function that increases the likelihood that a bin 150 will be purged as picks that would have qualified from another pick logic, then the system's current logic increase.

$$F(P_{alt}) = \frac{P_{alt}}{C}$$

If $F(P_{alt}) > 1$, then $F(P_{alt}) = 1$

If $F(P_{alt}) < 0$, then $F(P_{alt}) = 0$

Where C may be set based on testing at the retail sales facility 110 (initial value may be 2).

The systems and methods described herein analyze one or more bin purge factors and predetermined bin purge factor thresholds associated with the bins to determine whether or not to purge a bin (i.e., to empty all products from the bin) in order to pick a product from the bin for restocking shelves on the sales floor of the retail sales facility. The controlled determination of which bins to purge or not to purge in order to perform a product pick at a stock room of a retail sales facility advantageously manages the time and increases efficiency of the workers in stock rooms of retail sales facilities, and advantageously reduces worker time spent on bin purges that may not have been needed, enabling the workers to perform other tasks that may be more needed.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A method of facilitating on-shelf-availability of products at a retail sales facility, the method comprising:
providing an electronic database configured to store electronic data associated with the products at the retail sales facility, the electronic data including data representing tasks assigned to or performed by workers at the retail sales facility and data that represents at least one purge factor associated with at least one bin in a stock room location of the retail sales facility;

scanning, via an electronic scanning device of a worker at the retail sales facility, an identifier of the at least one bin in the stock room location of the retail sales facility to obtain identification data associated with the at least one bin, the electronic scanning device of the worker including at least one of a display and a speaker;

in response to the scanning of the identifier of the at least one bin:
generating, by the electronic scanning device of the worker, the electronic data identifying a task being performed by the worker via the electronic scanning device of the worker;
transmitting, from the electronic scanning device of the worker to the electronic database, data identifying the task being performed by the worker via the electronic scanning device of the worker as a task of picking at least one product from the at least one bin; and
updating the electronic data stored in the electronic database to include the data identifying the task being performed by the worker via the electronic scanning device of the worker in order to reflect, in the electronic database, that the worker initiated the task of picking the at least one product from the at least one bin;
receiving, at an electronic inventory management device including a control unit including a processor, a signal including the identification data obtained from the at least one bin by the electronic scanning device of the worker during the scanning;
transmitting, from the electronic inventory management device, a query to the electronic database including the identification data obtained from the at least one bin by the electronic scanning device of the worker during the scanning;
in response to the transmitting of the query to the electronic database, receiving, at the electronic inventory management device, a signal responsive to the query and including at least one bin purge factor associated with the at least one bin at the stock room location of the retail sales facility associated with the identification data obtained from the at least one bin during the scanning;
generating, via the processor of the electronic inventory management device, a predetermined threshold value in association with the at least one bin purge factor associated with the at least one bin at the stock room location of the retail sales facility associated with the identification data obtained from the at least one bin during the scanning;
correlating, via the processor of the electronic inventory management device, the at least one bin purge factor associated with the at least one bin and retrieved by the electronic inventory management device from the electronic database with the predetermined threshold value generated by the processor for the at least one bin purge factor in order to determine, by the processor, whether the at least one bin purge factor associated with the at least one bin and retrieved by the electronic inventory management device from the electronic database meets or exceeds the predetermined threshold value generated by the processor for the at least one bin purge factor;
determining, via the processor of the electronic inventory management device, and in response to a determination by the processor of the electronic inventory management device that each one of the bin purge factors associated with the at least one bin and retrieved by the electronic inventory management device from the electronic database meets or exceeds the predetermined threshold value generated by the processor for the at least one bin purge factor, that the correlating step supports generating a task for the worker to:
empty the at least one bin by removing all of the products from the at least one bin;
pick the at least one product from the products removed from the at least one bin, and
place the at least one picked product onto a shelf on a sales floor of the retail sales facility;
transmitting, from the electronic inventory management device and based on the determining, an electronic notification to the electronic scanning device of the worker;
in response to receipt of the electronic notification by the electronic scanning device of the worker, generating an output via at least one of the display and the speaker of the electronic scanning device of the worker, the output assigning to the worker a task to:
empty the at least one bin by removing all of the products from the at least one bin;
pick the at least one product from the products removed from the at least one bin; and
place the at least one picked product onto the shelf of the sales floor of the retail sales facility;
receiving an input at the electronic scanning device of the worker indicating that the worker picked the at least one product from the at least one bin;
in response to the receiving of the input:
transmitting, from the electronic scanning device of the worker to the electronic database, data indicating that the task of picking the at least one product from the at least one bin has been completed by the worker; and
updating the electronic data stored in the electronic database to include the data indicating that the task of picking the at least one product from the at least one bin has been completed by the worker in order to reflect, in the electronic database, that the task of picking the at least one product from the at least one bin has been performed by the worker.

2. The method of claim 1, wherein the at least one bin purge factor includes at least one of: a total number of times at least one product is picked from the at least one bin and binned in the at least one bin; a total number of picks scheduled for the at least one bin; a total number of products stored in the at least one bin; a department at the retail sales facility associated with the products stored in the at least one bin; accuracy percentage of the workers at the retail sales facility during picking or auditing of the at least one bin; accuracy percentage of at least one department at the retail sales facility in inventorying products in the at least one bin; and a number of tasks presently in que for at least one of the workers at the stock room location of the retail sales facility.

3. The method of claim 1, further comprising generating the predetermined threshold value of the at least one bin purge factor associated with the at least one bin based on a determination, by the electronic inventory management device, of whether the products in the at least one bin are stored as pallets, cases, or eaches.

4. The method of claim 1, wherein the generating further comprises generating, using the electronic inventory management device and based on the determining, an indication of a total number of bins and an identification of the bins from which all of the products are to be removed for the picking of the at least one product from the bins.

5. The method of claim 1, further comprising permitting the worker at the retail sales facility to manually adjust the predetermined threshold value for the at least one bin purge factor based on at least one previous audit or emptying of the at least one bin.

6. The method of claim 1, wherein, when the determining does not support the emptying of the at least one bin, further comprising generating an indication to the worker via the at least one of the display and the speaker of the electronic scanning device of the worker, the indication instructing the worker that the products in the at least one bin are to be individually scanned without emptying the at least one bin.

* * * * *